S. R. MEGOWN.
Dryers.
No. 157,018. Patented Nov. 17, 1874.
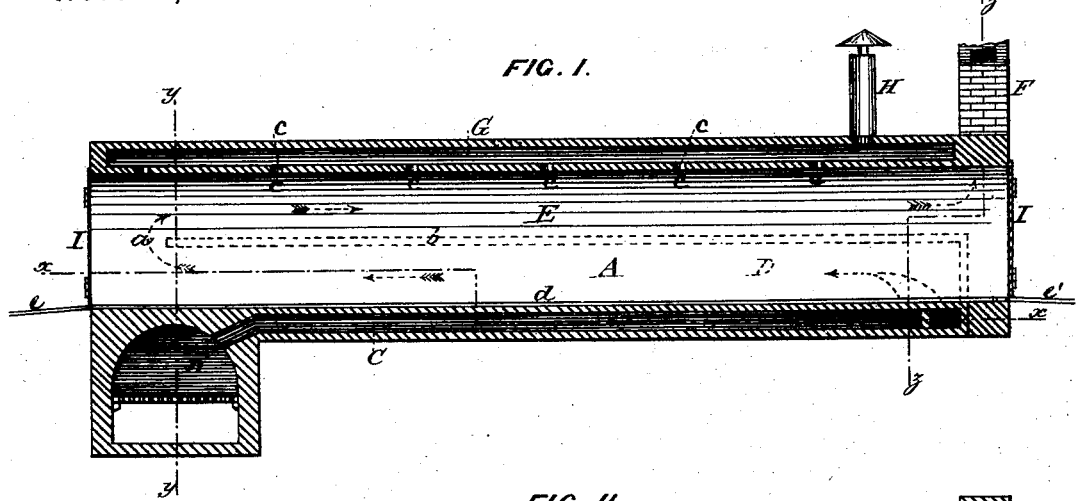
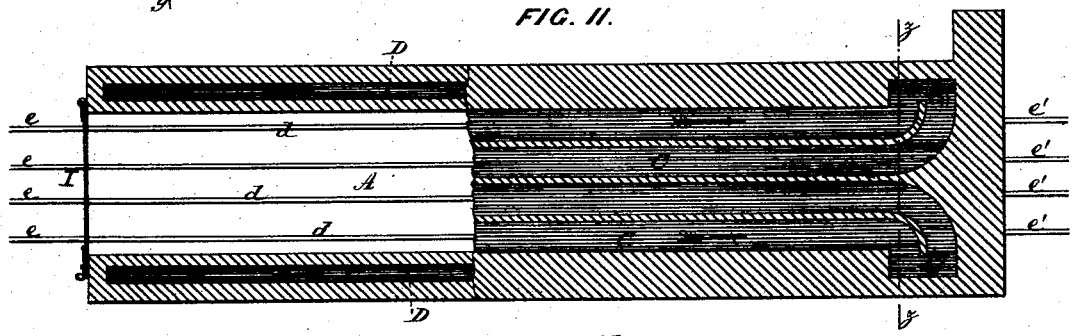
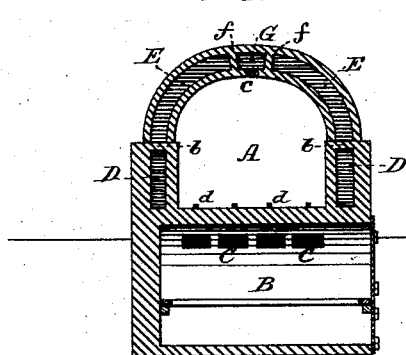
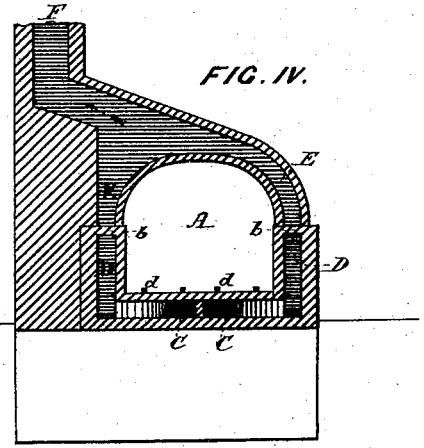
WITNESSES:
T. C. Smith
Harry Coleman
INVENTOR:
SAMUEL R. MEGOWN,
BY Johnson & Johnson
HIS ATTORNEYS.

UNITED STATES PATENT OFFICE.

SAMUEL R. MEGOWN, OF YOUNGSTOWN, OHIO.

IMPROVEMENT IN DRIERS.

Specification forming part of Letters Patent No. 157,018, dated November 17, 1874; application filed April 18, 1874.

*To all whom it may concern:*

Be it known that I, SAMUEL R. MEGOWN, of Youngstown, in the county of Mahoning and State of Ohio, have invented certain new and useful Improvements in Dry-Kilns for Brick, Lumber, and other Material by Heated Air, of which the following is a specification:

The object of my invention is to produce a drying-oven for bricks, pottery-ware, and lumber, in which the entire heat of the products of combustion shall be utilized for heating an inclosed drying-chamber before they escape into the chimney, and thereby save a large amount of fuel, and produce a uniform degree of heat upon all sides of the drying-oven without having any communication therewith.

The oven being made entirely of brick, there are no obnoxious or poisonous gases generated from it, as in furnaces constructed wholly, or in part, of iron.

This invention consists in the peculiar arrangement of flues, which are fed from only one furnace, and the heat and products of combustion caused to pass through bottom flues, return and double-return flues arranged in the sides and arched top surrounding the oven, before escaping, and wholly independent of the communication with said oven; while the double walls of the arch form a space occupied by three flues in the same circle, which serve as separate and distinct flues to heat the whole inner wall of the arch, and carry off the vapors from the oven, and thereby utilize the oven-crown not only to carry off the heat from the furnace, but the vapors from the oven, the central flue being formed between the arch-flues and within the same brick-work.

I will now more definitely describe my invention, reference being had to the accompanying drawings, forming a part of this specification, and in which—

Figure 1 represents a vertical longitudinal section of a drying-kiln embracing my invention; Fig. 2, a horizontal section of the same at the line $x\ x$ of Fig. 1. Fig. 3 is a vertical cross-section at the line $y\ y$ of Fig. 1, and Fig. 4 a vertical cross-section at the line $z\ z$ of Figs. 1 and 2.

In the drawings, A represents the oven or kiln, on the floor of which are laid tracks or rails $d$ for the trucks, for transmitting the brick, &c., through the oven, and which, entering at one end, pass out at the other, both ends of the oven being open for that purpose, as shown in Fig. 1. At the front end, and below the line of the floor of the oven, is arranged the furnace B, opening at the side, and provided with suitable grate, ash-pit, and doors. A series of flues, C C, connect with the furnace B above the grate, and, passing under the floor of the oven to the rear end thereof, ascend and communicate with return-flues D D, arranged in the side walls of the oven. The divisions of these flues C are curved at their back ends, and enter spaces C' C' at the sides, where they join the flues D D, which, passing along the double-walled sides, connect at their front ends by an opening, $a$, with double upper return arch-flues E E, which are divided by a horizontal partition, $b$, (seen in dotted lines in Fig. 1,) from each other, and these communicate with the chimney F at the rear of the oven. In the under arched wall of the oven are arranged a number of holes, $c\ c\ c$, through which the vapors, steam, and hot air pass into a central flue, G, and out at a flue or ventilator, H, and thence into the air, thereby getting rid of all the moisture thrown off from the material being dried, and obtaining by the same means a complete circulation of the hot air through the oven, and up through the crown of the arch, where it is utilized to keep the double walls hot. The side flues D and arch-flues E connect over the inner arched wall, where they enter the chimney-flue F, as shown in Fig. 4, while the central arch-flue has no communication with the chimney, and is formed, like the arch-flues E, by division-walls $f\ f$ within the double-walled space, thereby obtaining separate and distinct flues, which cover the crown of the oven, and serve to heat the latter and carry off the vapors without the necessity of building outside flues for this purpose.

The course of the products of combustion is indicated by the arrows, and the operation of the oven or kiln is as follows: The bricks, pottery-ware, or lumber are placed on suitable trucks, and passed into the oven on the tracks, and the doors I I securely closed at both ends. The fire being kindled in the furnace, the products of combustion pass into the flues C C, along under the floor, ascend at their rear ends into the return side flues D D, and pass to the front end, ascending here again, and pass through the double-return arch-flues E E, and out through the chimney, thus enveloping the long oven with the heat from a single furnace. The vapors and steam arising from the wet bricks, pottery-ware, or lumber pass through the holes $c\ c$ in the ceiling of the oven into central arch-flue G, and thence into the atmosphere through the pipe H, by which, also, the draft from the oven is produced.

It will thus be seen that the entire heat is obtained from the products of combustion, and, as the oven is surrounded on all sides by heat, the drying process is very much facilitated. By the double walls, with the flues in them, radiation of heat is also prevented, and the obnoxious or poisonous gases are carried off through the chimney.

This oven and furnace may be also used to heat the air for buildings, by connecting the central arch-flue with the pipes leading through the building, in which case both ends of the oven are closed, except openings in one end for the entrance of cold air to be heated; and, as the air-heating oven is entirely isolated from the heating-flues, there is no possibility of smoke or gases mingling with the hot air.

The railway-tracks of the oven connect with tracks at each end, so that the trucks are passed into and through the oven in any suitable manner in the operation of drying, thus rendering the operation continuous without interrupting the fires, and requiring only the entrance-door to be opened in running in the truck or trucks, and the exit-door to be opened to withdraw the truck or trucks, one door being only opened at a time for this purpose, thereby retaining the heat of the oven both in supplying the article to be dried, and in removing it after the drying is completed.

I claim—

1. The combination of a furnace with bottom flues C and return and double-return flues D and E, arranged substantially as shown and described.

2. The flues E, G, and E, formed directly between the double walls of the arch by the division-walls $f\ f$ and $b\ b$, as shown and described, whereby the double walls serve for the separate and distinct flues, which heat the oven-crown from the furnace and carry off the vapors from the oven.

SAMUEL R. MEGOWN.

Witnesses:
ROBERT B. MURRAY,
JAMES J. HANNMAN.